United States Patent

Brunialti et al.

[15] 3,701,841

[45] Oct. 31, 1972

[54] DATA TRANSMISSION BY TELEPRINTER

[72] Inventors: Bruno Brunialti; Giovanni Zaffignani, both of Ivrea, Italy

[73] Assignee: Ing. C. Olivetti & C. S.p.A., Ivrea (Turin), Italy

[22] Filed: May 19, 1971

[21] Appl. No.: 145,055

Related U.S. Application Data

[63] Continuation of Ser. No. 764,118, Oct. 1, 1968, abandoned.

[52] U.S. Cl. ....................................178/4.1 B

[51] Int. Cl. ....................................H04q 9/00

[58] Field of Search......340/163, 226; 178/23, 4.1 R, 178/4.1 B

[56] References Cited

UNITED STATES PATENTS

| | | | |
|---|---|---|---|
| 2,115,185 | 4/1938 | Weber | 178/4.3 |
| 3,143,597 | 8/1964 | Hagstrom et al. | 178/4.1 |
| 3,444,521 | 5/1969 | Breese | 340/163 |

*Primary Examiner*—William C. Cooper
*Assistant Examiner*—Jon Bradford Leaheey
*Attorney*—Birch, Swindler, McKie, & Beckett

[57] ABSTRACT

Terminal station equipment for exchange of messages with a central data collecting station, including both message characters and service functions. The terminal station equipment includes a recognition device for the service functions and a parity checking device for the message characters, and a control unit responsive to both for controlling the generation of service functions necessitated by the information detected thereby.

3 Claims, 5 Drawing Figures

INVENTORS
BRUNO BRUNIALTI
GIOVANNI ZAFFIGNANI

*INVENTORS*
BRUNO BRUNIALTI
GIOVANNI ZAFFIGNANI

INVENTORS
BRUNO BRUNIALTI
GIOVANNI ZAFFIGNANI

*INVENTORS*
BRUNO BRUNIALTI
GIOVANNI ZAFFIGNANI

*INVENTORS*
BRUNO BRUNIALTI
GIOVANNI ZAFFIGNANI

DATA TRANSMISSION BY TELEPRINTER

This application is a continuation of Ser. No. 764,118, Oct. 1, 1968, now abandoned.

The present invention concerns a teleprinter type equipment for a data transmission system in which a plurality of terminal transmitting and receiving stations can be connected to a central collecting station. Known equipment comprises a teleprinter for transmitting and receiving data constituted by characters and service functions, in which the generation of each character in the form of binary code takes place by means of the positioning of code bars which can be effected manually through character keys of automatically through equivalent means. A parity device is used to check the parity of received codes and a recognition device recognizes the service functions. A control unit responds to the parity device and the recognition device and controls the generation of service functions in binary code for transmission back to the central station.

The central station is generally constituted by an electronic computer. The connecting lines between the terminal stations and the central station may be both telegraph and telephone lines.

The object of the present invention is to provide means adapted to establish safeguards against erroneous transmission of data or inefficient use of the system through premature transmission. In fact, at the moment of connection, a dialogue for the control of the connection is instituted between each terminal station and the electronic computer. The dialogue procedure consists in the exchange of special service characters between the terminal station and the electronic computer for the purpose of checking the state of the terminal station and verifying the possibility of sending messages and, on receipt of the individual messages, of signalling the correctness of such receipt to the transmitting portion.

The service characters are generated for initiating the conversation or for accompanying the message transmitted, or are generated automatically in response to a service character or to a message received.

In known systems, these service characters are generated at the terminal station by a special device of static or cyclic type controlled by the device controlling the terminal station. This entails the addition to the receiving and transmitting equipment of the station of a separate device for automatically generating special characters, which results in complication of the equipment and an increase in its over-all dimensions and cost.

The present invention proposes to reduce the complexity of the equipment of the terminal station and the other drawbacks referred to above by utilizing part of the elements employed for the generation of the normal characters, for the automatic generation of special characters.

According to the invention there is proved terminal station equipment for the exchange of messages with a central data collecting station, comprising a teleprinter for transmitting and receiving data constituted by characters and service functions, in which the generation of each character in the form of binary code takes place by means of the positioning of code bars, a parity checking device and a recognition device for the service functions, both fed by the receiving portion of the teleprinter, and a control unit responsive to the parity device and to the recognition device for controlling the generation of service functions in binary code and feeding such functions to the transmitting portion of the teleprinter, the service functions being generated by a plurality of means each of which is arranged to generate a service function by positioning the said code bars so as to obtain the binary code corresponding to the service function, the said means being adapted to be rendered operative selectively by the control unit in consequence of the receipt of service functions and in response to the parity control effected on the received message.

The invention will be described in more detail, by way of example, with reference to the accompanying drawings, in which.

GENERAL DESCRIPTION

Figure 1:
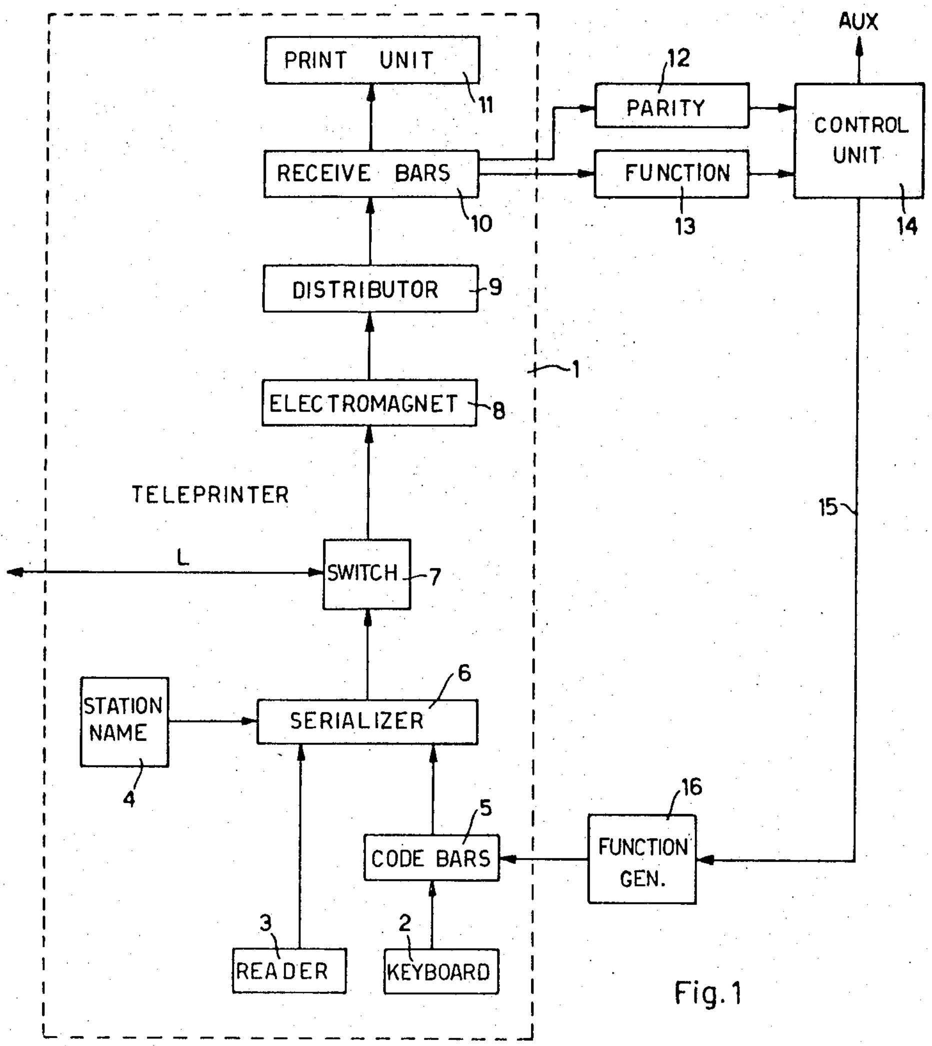
FIG. 1 is a block diagram of equipment embodying the invention.

FIG. 1 shows a teleprinter apparatus 1 constituted essentially by a transmitting portion and a receiving portion and operating as a terminal station connected by means of a line L to a central data collecting station constituted by an electronic computer (not shown in the drawing).

The transmitting portion is constituted essentially by a keyboard 2, a perforated-tape reader 3 and a station-name transmitter 4. The keyboard and the tape reader can operate alternatively as input devices. Characters and service functions can be set on the keyboard 2 and are translated into binary codified form by means of code bars 5 positioned by the keyboard. The signals in binary code sent in parallel by the code bars 5, by the reader 3 and by the name transmitter 4 are sent for transmission on the line L through the medium of a serializer 6 and a switching device 7.

The elements forming the transmitting portion are of a type known for example, from Ricciardi and Ukmar, U.S. patent applications Ser. Nos. 647,648, filed June 21, 1967 and 714,488, filed Mar. 20, 1968.

The receiving portion is constituted by a receiving electromagnet 8 fed by the code signals of the line L via the switching device 7, a distributor 9 for the signals received from the electromagnet, receiving bars 10 which are positioned by the signals issuing in parallel from the distributor and a printing unit 11 which is actuated by means of the receiving bars 10. The latter permit the decoding both of the characters to be printed and of the functions which are effected by suitable means as will be described hereinafter.

The elements forming the receiving portion are of a type known, for example, from Ricciardi and Sandrone, U.S. patent applications Ser. Nos. 638,180, filed Apr. 25, 1967, 643,230, filed June 2, 1967, 655,132, filed July 21, 1967, and from Gassino and Bovis application Ser. No. 616,993, filed Feb. 17, 1967, now U.S. Pat. No. 3,404,765.

The switching device 7 permits connection of the transmitting portion or the receiving portion to the line L. The switching device has the function of keeping the line L connected normally to the receiving portion, so that the terminal station is always ready to receive signals, and of automatically changing the connection over to the transmitting portion for sending the first interrogation code of the transmitting station to the computer.

Assuming that the terminal station is connected to the central computer by means of a telephone line, for transmission of the signals conversion of the direct-current signals supplied by the terminal station and by the computer into audio frequencies is required. This effected in known way by means of a so-called modulating-demodulating signal converter which is located between the output from the terminal station and the line and correspondingly between the output from the computer and telephone line. This converter is not shown in drawing.

The code used by the equipment may be, for example, the CCITT (International Telephone and Telegraph Consultative Committee) ISO code consisting of 7 + 1 bits, so that the characters are constituted by 1 "-start" bit, 7 information bits, 1 parity bit and 2 "stop" bits, that is 11 bits in all.

A series of interlocks, not shown in FIG. 1, lock the keyboard and the name transmitter when the tape reader is in operation, and also the transmission of the name locks the reader and prevents the transmission of the codes which have been set at the same time on the keyboard.

The name transmitter is employed to transmit a code representing the name of the terminal station and is rendered operative both by depression of a special key in the keyboard called the "HERE IS" key and automatically (as will be described hereinafter) on receipt by the terminal station of a special code representing the so-called "ENQUIRY" service function.

To the apparatus 1 there are moreover connected a parity device 12 and a function recognition device 13 which are both fed by the receiving bars 10. The parity device 12 is adapted to control the parity of each group of 8 bits of information which position the receiving bars 10 through the receiving electromagnet 8 and the distributor 9 and, for example, is of the type described in Garberi and DeFalco U.S. patent application Ser. No. 762,015 filed Sept. 24, 1968 by Sergio Tarbeni and Tian Franco DeFalco and assigned to the same assignee as the instant application.

The function recognition device is of known type and is adapted to recognize those combinations of 8 bits of information which do not represent a character to be printed, but a special service function, for example carriage return, line feed, space ENQUIRY and other service functions provided for the control of the apparatus 1 and for the dialogue procedure with the central computer.

The parity device 12 and the function recognition device 13 feed a control unit 14 which is adapted to control the apparatus 1 by effecting specific service functions (for example, line feed, space, transmission of the station name, etc.) through the commands supplied at the output AUX and by controlling the generation of other service functions in response to those received during the dialogue procedure with the computer through commands supplied at an output 15.

The output 15 controls an automatic service function generator 16 constituted essentially by a series of electromagnets energized selectively by the control unit 14 and each of which effects the positioning of the code bars 5 for the generation of the binary code representing a particular service function. The automatic function generator 16 therefore acts on the code bars 5 in a manner similar to the action performed manually by means of the keyboard 2. The structure of the control unit and the operation thereof as regards the control of the generation of service functions will be found briefly described hereinafter.

It is necessary to observe that, on receiving service functions recognized by the device 13, the control unit locks the printing unit 11 by means of a special command at the output AUX if the service function codes are not to give rise to particular printed symbols.

When a connection is being set up between the terminal station and the computer, a dialogue procedure starts in order to establish the connection and control it. We will assume that in this dialogue the initiative is left to the central computer, that is, the computer interrogates the various terminal stations in succession on the basis of its own program, whereby it has the possibility of connecting itself by either of two procedures called the "sounding" and "selection" procedures.

The sounding procedure (also known as polling procedure) is that by which the computer places itself at the disposal of the terminal stations in the event of the latter having a message to transmit.

The "selection" procedure is that by which the computer informs the terminal stations that it has some message to send.

In both cases, the dialogue begins with the sending by the computer to the terminal station of a suitable service function which has the significance of interrogation, namely;

in sounding — "Have you a message to transmit?,"
in selection — "Are you ready to receive?."

As a consequence of this first step, the terminal station must reply with a service function which may have one of these significances:

in sounding — "I have a message to transmit" or "I have nothing to transmit,"
in selection — "I am able to receive" or "I am not able to receive."

As a safeguard against errors of transmission or loss of reply, the computer waits for a reply for a prefixed time; if none of the possible replies arrives, the computer repeats the interrogation. This technique is called a fixed-time procedure.

Connection having been established, the transmission starts, interspersed with service functions sent by the computer or by the terminal, according to the main direction of transfer of the messages, in order to eliminate possible errors of transmission. The transmission takes place in blocks of characters in accordance with a known technique, each character being subjected to a parity check at the receiving station; when an error is detected at the receiving station, it sends to the transmitting station a particular service function signifying a request for retransmission of the block that has been received incorrectly. At the end of the transmission, the transmitting station sends a particular service function which signifies the end of the dialogue and causes the breaking of connection.

DIALOGUE PROCEDURES

As already stated hereinbefore, it is assumed that the characteristics of the dialogue between the terminal station and the computer are such as to leave the initiative of each exchange of data to the computer, which controls both the sending and the reception of the various messages in accordance with precise procedures and rules.

The terminal station communicates with the computer in accordance with the two separate procedures called "sounding" and "selection," which give rise to an exchange of special service functions between the terminal station and the computer for the purpose of verifying the possibility of connection.

The special service functions which govern the conversation between the terminal station and the computer are: EOT (call-up by the computer and notification or non-consent by the terminal station), STX (start of text of message), ETB (end of block of text), ETX (end of message), ACK (text received correct and consent by the terminal station), NACK (text received not correct).

By the "sounding" procedure, the computer asks the terminal station whether it has any data to send it.

The computer initiates the conversation by sending to the terminal station the special function EOT followed by an address character of the terminal; the terminal station replies with: address character · EOT: if it has nothing to transmit; address character · STX: if it has a message to transmit; in this case, STX is followed by the text of the message.

The message is terminated by an "end-of-block" character ETB or and "end-of-text" character ETX.

Control of the transmission, which is effected by the computer, involves a positive reply(ACK) or a negative reply (NACK) on the part of the computer.

If the reply by the computer has been NACK, the terminal station repeats the transmission of the block previously transmitted (preceded automatically by STX).

After the reply ACK by the computer, if the terminal station still has messages to send it transmits the function EOT which causes the computer to repeat the initial sequence.

Figure 2:
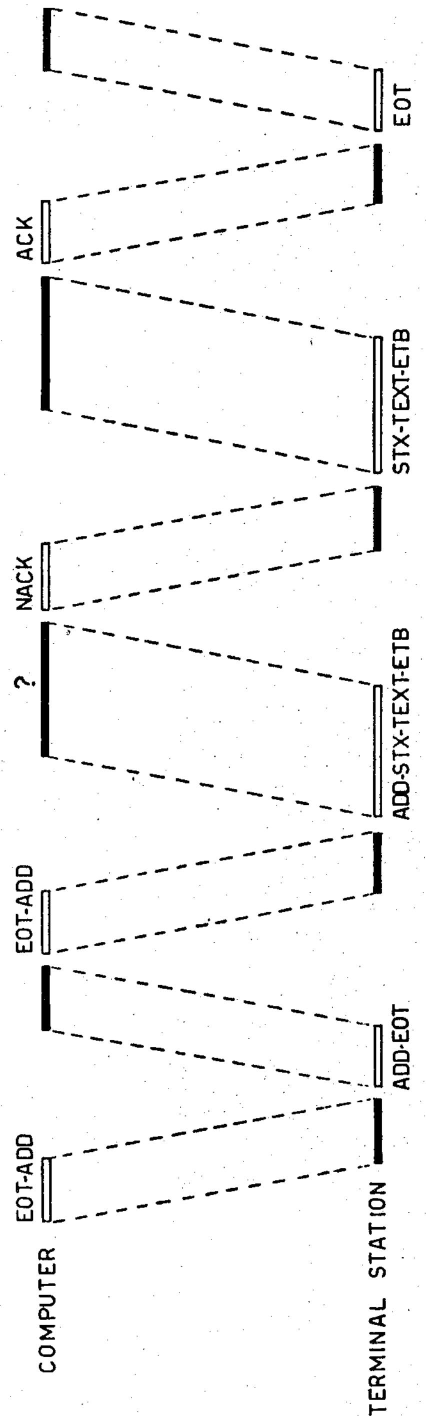
FIG. 2 is a time diagram of the so-called "sounding" dialogue procedure between the equipment of FIG. 1 and a central station.

A typical "sounding" sequence is that illustrated in FIG. 2, in which "ADD" represents the address character and "TEXT" denotes a message block. The interrogation mark indicates a false parity check.

We will now describe the "selection" procedure, by which the computer asks the terminal station whether it is ready to receive data.

The computer initiates the dialogue by sending to the terminal station the special function EOT followed by an address character of the terminal: the terminal station replies with: address character · ACK:if it is ready to receive the message address character · EOT: if it is not able to receive the message.

Only in the first case does the computer transmit the text directly to the terminal station without using any further exchange of service characters; the text is begun with STX and terminated with ETB or ETX, according to whether the end of a block or the end of the text is concerned.

The terminal station effects control of the transmission, sending the character ACK or NACK, according to the result of the parity check.

The receipt of a function NACK by the computer entails the repetition of the transmission of the message block that is wrong.

Figure 3:
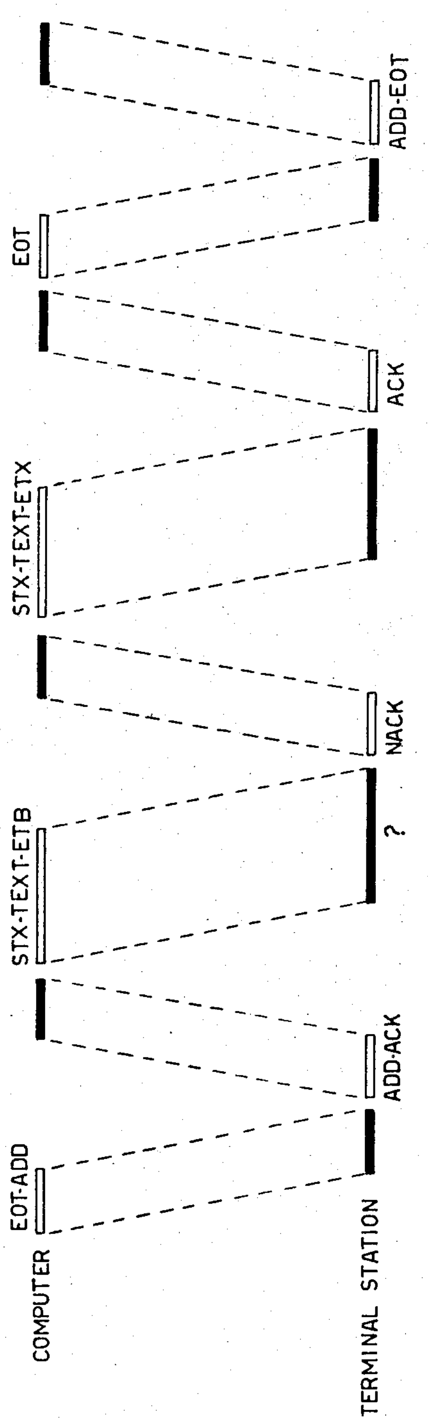
FIG. 3 is a time diagram of the so-called "selection" dialogue procedure between the equipment of FIG. 1 and a central station.

A typical "selection" sequence is that shown in FIG. 3.

The impairment or loss of one of the special service functions which regulate the dialogue between the terminal station and the computer would create a situation of ambiguity for the continuation of the dialogue. In order to obviate this, as has already been said, fixed-time procedures are provided and these begin with the reception of an incorrect service function or with the absence of reception of a service function.

The fixed time elapse both in the terminal station and in the computer, according to the state of transmission and to which has the supervision thereof, as is made clear hereinafter.

a. In the "sounding"procedure, non-reception by the terminal station of the sequence "EOT · address character" transmitted by the computer entails no reply to the computer and, on the expiry of the fixed time started in the computer, this causes the retransmission of a "sounding" sequence.

b. In the "sounding" procedure, the loss or the impairment of the reply sequence "address character · EOT" of the terminal station, when this has nothing to transmit, produces, as in the preceding case, the retransmission of a "sounding" sequence on the expiry of the fixed time of the computer.

c. Both in the "sounding" and in the "selection" procedure, the loss or the impairment of the reply ACK or NACK after the transmission of a message block causes the repetition of the block on the expiry of the fixed time of the transmitting station.

d. In the "sounding" procedure, the loss or the impairment of the function EOT which the terminal station sends to the computer at the end of a block after the reply ACK of the computer causes the repetition of the reply ACK by the computer on the expiry of the fixed time of the computer.

e. In the "selection" procedure, the loss or the impairment of the reply function ACK or NACK of the terminal station (positive or negative reply to a block transmitted by the computer) causes the repetition of the block on the expiry of the fixed time of the computer.

f. In the "selection" procedure, the loss or the impairment of the sequence "address character · ACK" or "address character · EOT" of reply of the terminal station to the "selection" sequence causes the retransmission of the "selection" sequence on the expiry of the fixed time of the computer.

CONTROL UNIT

The control unit 14 is composed of an assembly of circuits which provide for storing the service functions which are recognized by the function recognition device 13, lighting signal lamps and controlling the automatic transmission of service functions by the service function generator 16.

Figure 4:
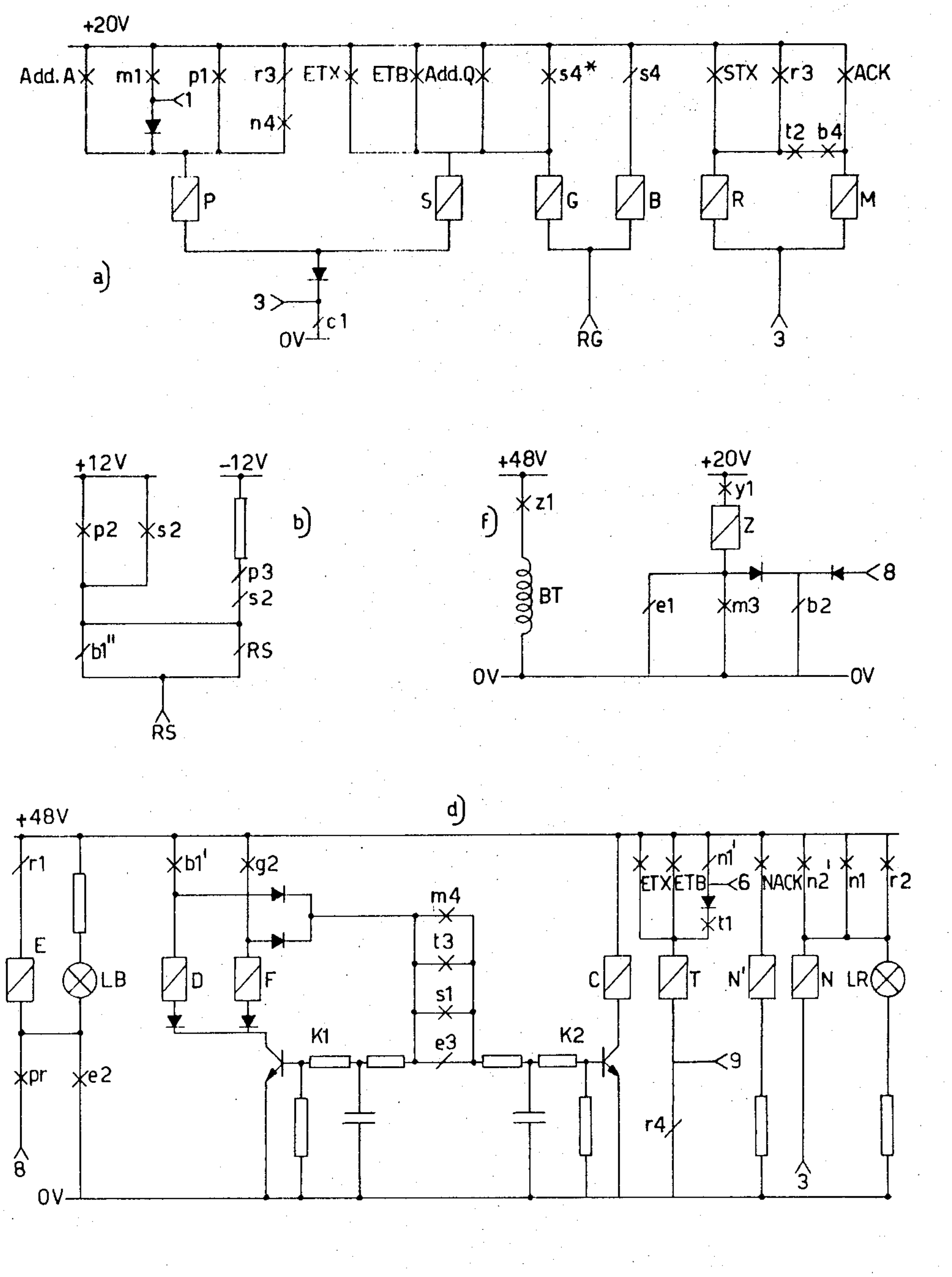
FIGS. 4 and 5 show a number of electric control circuits contained in the control unit included in the equipment of FIG. 1.
Figure 5:
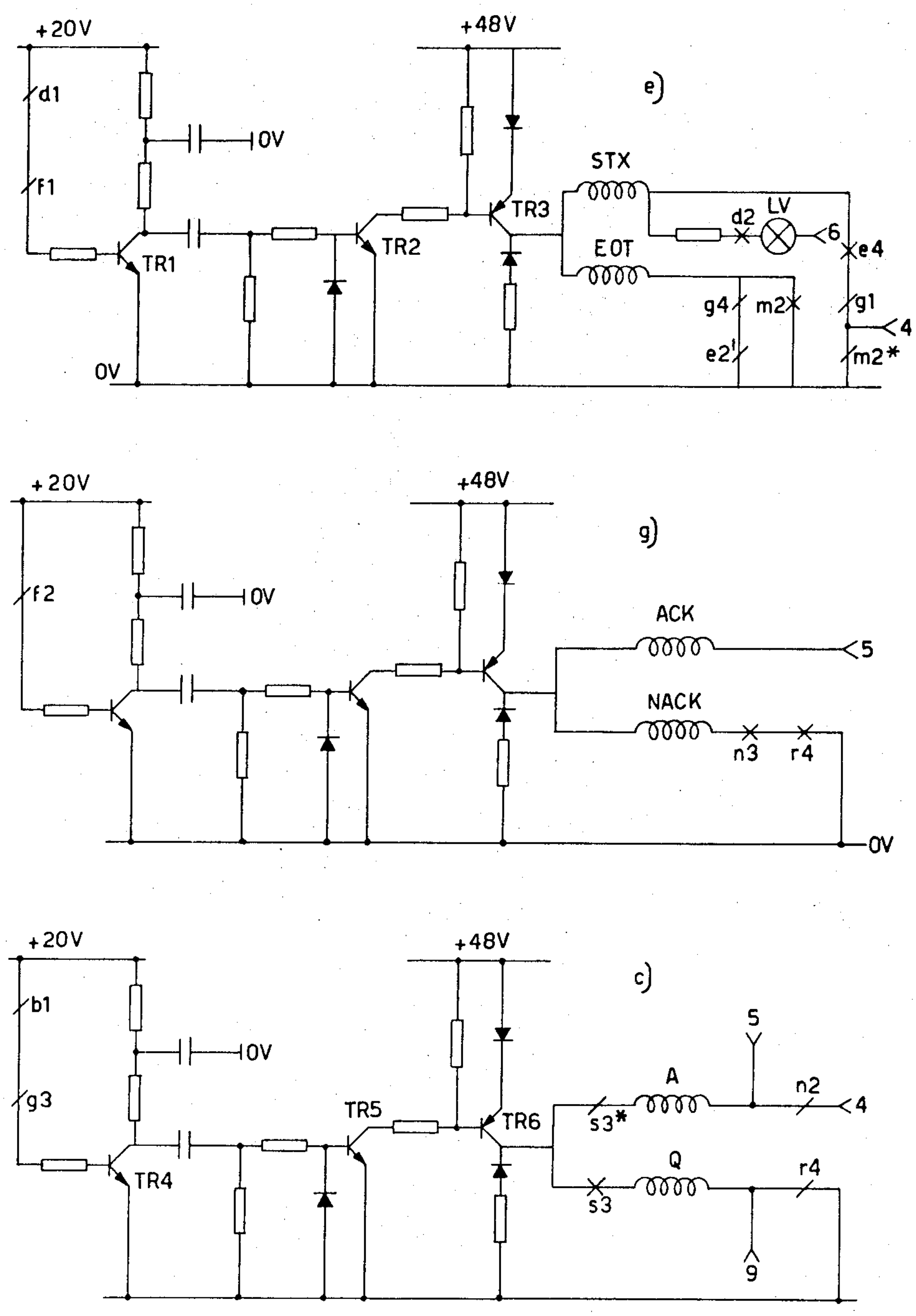

FIGS. 4 and 5 show a number of circuits included in the control unit 14 which are rendered operative during the "sounding" and "selection" procedures. Their operation will now be explained with reference first to the "sounding" procedure and then to the "selection" procedure.

It should be noted that these symbols are used in the drawings: / indicates a normally closed and contact *x* indicates a normally open contact.

FIG. 4 comprises the sounding" indicated by a), b), d) and f), while FIG. 5 comprises the circuits indicated by c), e) and g). Like numbered terminals in these circuits are connected together.

In the "sounding" procedure, the function recognition device 13 recognizes the group "EOT · Address A" among the codes received from the receiving bars 10: the function EOT sends a signal to the control unit 14 which produces the cutting out of the printing unit, while the "Address A" sends a signal to the control unit 14 by closing the contact Add. A in the circuit indicated by a) in FIG. 4.

This energizes the relay P which locks on through its contact *p*1. Moreover, the relay P acts on the contact *p*2 (circuit *b*) of FIG. 4), closing it and causing the sending of the signal RS, which conditions the modulating-demodulating converter to which reference has been made hereinbefore; the converter replies with a signal RG which causes the closing of the circuit of the relay B and moreover produces the closing of the contact *y*1 of the circuit f): in this way the relay Z is energized and closes the contact *z*1, so energizing the electromagnet BT which effects the auxiliary function AUX of locking the keyboard 2.

The relay B acts on the circuit c) of FIG. 5, causing the opening of the contact *b*1 and consequently putting the transistor TR4 into the blocked state: the transistors TR5 and TR6 therefore become conductive and, consequently, the electromagnet A (belonging to the function generator 16) is energized and causes the generation of the code corresponding to the function "address A" acting on the code bars 5.

The relay B moreover acts on the circuit d), closing the contact *b*1' and therefore causing the relay D to be energized (with a delay of 100 ms produced by the delay circuit K1) and moreover causing the relay C to be energized (with a delay of 300 ms produced by the delay circuit K2). The relay D (energized after 100 ms) acts on the circuit e), causing the opening of the contact *d*1 and therefore, the blocking of the transistor TR1; consequently, the transistor TR2 becomes conductive, as also does the transistor TR3, which latter produces the energization of the electromagnet EOT (belonging to the function generator 16), which causes the generation of the code corresponding to the function EOT acting on the code bars 5.

The relay C (energized after 300 ms) opens the contact *c*1 in the circuit a), which interrupts the supply of the relay P, and consequently the contacts *p*1 and *p*2 (circuit b) open: the latter contact cancels the signal RS to the modulating-demodulating converter and, consequently, the signal RG is cancelled, as a result of which the relay B is deenergized.

The deenergization of the relay B causes the closing of the contact *b*1 and, therefore, return of the entire circuit c) to he rest or inoperative condition; moreover, it causes the opening of the contact *b*1' of the circuit d) and, therefore, the deenergization of the relays C and D, with return of the circuits d) and e) to rest or inoperative conditions.

The reception of the codes "EOT · Address A" and the sending of the codes "Address A · EOT" to the computer continue until the terminal station needs to transmit a message. When it is desired to transmit a message, the operator depresses a reservation key, which closes the contact *pr* in the circuit d), thus energizing the relay E. The contact *e*2 is consequently closed and causes the self-holding of the relay E and lighting of a white lamp LB, while on release of the reservation key the contact *pr* reopens. Moreover, the contact *e*1 in the circuit f) is opened, which was keeping the relay Z controlling the locking of the keyboard 2 energized, as a result of which release of the keyboard takes place.

The contact *e* 3 in the circuit d) is moreover opened, permitting the energization of the relay D while preventing the energization of the relay C (it should be noted that the contact *b*1' continues to remain open on account of the persistence of the energization of the relay B).

Finally, the energization of the relay E causes the opening of the contact *e*2' in the circuit *e*), whereby the supply to the electromagnet EOT is cut off, and at the same time the contact *e*4 is closed and supplies the electromagnet STX (belonging to the function generator 16) and, therefore, causes the generation of the code STX on the code bars.

It should be observed that in the meantime the circuit c) has continued to function in an unchanged manner, whereby there is always energization of the electromagnet A, with generation by the function generator 16 of the "address A" by means of the code bars 5. The function "address A" is generated in advance of the function STX, which in this case replaces the signal EOT generated in the preceding sequences. In other words, the depression of the reservation key prevents the sending of the sequence "Address A · EOT", as a reply to the "sounding" sequence, and causes the sending of the sequence "Address A · STX."

Under these conditions, a green lamp LV lights up and indicates to the operator the sending of the signal STX. Moreover, the contact *e*1 in the circuit f) opens, so that the electromagnet Z is deenergized and the keyboard is therefore released.

At this point, the operator can initiate the transmission of the text by manually depressing the keys of the keyboard 2.

The sending of the signal ETB or ETX produces the closing of the contact ETX or ETB and, therefore, the energization of the relay T in the circuit d); the relay T is self-holding through the closing of the contact *t*1 and moreover closes the contact *t*2 in the circuit a) and the contact *t*3 in the circuit d). On closing, the contact *t*3 energizes the delay circuit K2 which energizes the relay C after a delay of 300 ms: the relay C, by opening the contact *c*1 in the circuit a) produces the deenergization of the relay P and therefore causes the return of all the circuits in question to rest.

Before this sequence occurs, in particular the energization of the relay C, the computer will send a signal ACK or NACK, which signals will produce replies as specified hereinafter.

Let us consider first the case of reception of the signal ACK. In this case, there will be closing of the contact ACK and, therefore, energization of the relay M in the circuit a) and, consequently, closing of the contact *m* 2 and opening of the contact *m**2 in the circuit e), so that the electromagnet EOT is energized, with the consequent sending of the signal EOT, while the electromagnet of "address A" in the circuit c) cannot be energized. The procedure then resumes under the same conditions, as described from the beginning.

Let us now assume that the signal sent by the computer and received by the terminal station is NACK. In this case, there is energization of the relay N', closing of the contact *n2'* in the circuit d) and, therefore, energization of the relay N and subsequent closing of the holding contact n1 and opening of the energizing contact *n2* of the electromagnet of "address A" in the circuit c). Therefore, only the signal STX controlled by the circuit e) is sent, in which circuit the electromagnet STX is in the energized state (contacts *m**2 and *e4* closed). Consequently, the keyboard is released, as already seen hereinbefore, so that the operator can repeat the block already transmitted.

Moreover, we also observe that in the case of reception of the signal ACK the relay R is energized (inasmuch as the contacts *t2* and *b4* in the group a) are closed): consequently, the holding contact *r3* is closed and the contact *r1* is opened, with deenergization of the reservation relay E, and the contact *r4* is opened, which causes the deenergization of the relay T. Through the closing of the contact *e3*, the relay C is energized and this gives rise, in the manner already seen before, to deenergization of all the circuits. Hence, the initial conditions obtain again.

Finally, let us observe that when the terminal station is receiving ACK, it remains blocked (*m3* closed) until the following "sounding" sequence.

In the "selection" procedure, the computer sends the group of functions "EOT · address Q", which are received, and closing of the contact Q in the circuit a) takes place by way of the function recognition device 13. Similarly to the case of "sounding", closing of a relay S takes place and this, self-held by its contact *s**4, closes the contact *s2* in the circuit b) and, through the modulating-demodulating converter, which receives a signal RS causes the arrival of a signal RG which energizes the relay G in the circuit a).

The contacts *s1* and *g2* in the circuit d) close: in this case, the relay F is energized (after a delay of 100 ms) and after 300 ms the relay C is energized. The contacts *g4* and *g1* in the circuit e) are opened, since this circuit must not operate in this "selection" phase. Note also that the signal RG of the modulating-demodulating converter has locked the keyboard through the energization of the relay Z.

The opening of the contact *g3* in the circuit c) effects the supply of the electromagnet Q, through the closing of the contact *s3*, and the opening of the contact *s**3, which cuts out the coil A, so that the function "Address Q" is sent.

The relay F is energized after a delay of 100 ms and this causes the opening of the contact *f2* in the circuit g) and, consequently, the electromagnet ACK is fed through the closed contact *m2* circuit e) and the closed contact *n2* circuit c), with resultant generation of the function ACK by means of the code bars 5.

The computer then sends the sequence STX-text-ETB or ETX, according to whether the end of a block or the end of a text is concerned.

The reception of the signal STX causes the closing of the contact STX and the energization of the relay R, which produces the closing of the contact *r2* in the circuit d): in the case of a signal NACK transmitted by the parity control unit 12, energization of the relay N occurs and this closes the contact *n3* in the circuit g), in which the contact *r4* is already closed, and therefore the electromagnet NACK is energized and a signal NACK is sent to the computer.

In the event of the text being received correctly, on the arrival of the signal ETB or ETX, the relay S is energized, with resultant energization of the relay G and then the relay F: the latter opens the contact *f2* in the circuit g), so that the electromagnet ACK is fed, the contact *n2* in the circuit c) and the contact *m**2 in the circuit e) being closed.

The computer then replies with EOT, which gives rise to a fresh sequence like that described for the case of "selection."

It will be evident that many minor changes can be made in the illustrative embodiment disclosed herein without departure from the invention. Accordingly, the invention is not to be considered limited to the embodiment disclosed, but rather only by the scope of the appended claims.

I claim:

1. A system for exchanging messages with a station, wherein said messages include characters and service functions, comprising:
   - means for transmitting said messages to said station, said transmitting means including code bars for generating said transmitted message and keyboard means for positioning said code bars;
   - means for receiving said messages from said station;
   - means, responsive to said receiving means, for recognizing service functions in said received message and,
   - control unit means connected between said recognizing means and said transmitting means and responsive to said recognized received service functions for positioning said code bars to represent service functions to be transmitted.

2. A system according to claim 1, wherein said control unit means includes generating means including electromagnets, said electromagnets positioning said code bars in response to said recognized received service functions.

3. A system according to claim 2, including a parity checking device connected in parallel with said recognizing means between said receiving means and said control unit, said control unit being response to said parity checking device and said recognizing means.

* * * * *

UNITED STATES PATENT OFFICE
CERTIFICATE OF CORRECTION

Patent No. 3,701,841 Dated October 31, 1972

Inventor(s) Bruno Brunialti et al

It is certified that error appears in the above-identified patent and that said Letters Patent are hereby corrected as shown below:

On the facing page of the patent below "[21] Appl. No.: 145,055 the following should be inserted:

--Foreign Application Priority Data

October 2 , 1967 Italy 53228-A/67--

Signed and sealed this 17th day of September 1974.

(SEAL)
Attest:

McCOY M. GIBSON, JR.
Attesting Officer

C. MARSHALL DANN
Commissioner of Patents